(12) United States Patent
Klicpera et al.

(10) Patent No.: US 11,133,631 B2
(45) Date of Patent: Sep. 28, 2021

(54) REVERSIBLE JUMPER SYSTEM FOR NON-ISOLATED HIGH POWER OR ISOLATED LOW POWER SELECTION

(71) Applicant: ZEBRA TECHNOLOGIES CORPORATION, Lincolnshire, IL (US)

(72) Inventors: Christopher P. Klicpera, Westbury, NY (US); Eric Trongone, West Babylon, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 161 days.

(21) Appl. No.: 16/656,185

(22) Filed: Oct. 17, 2019

(65) Prior Publication Data
US 2021/0119395 A1  Apr. 22, 2021

(51) Int. Cl.
*H01R 31/08* (2006.01)
*G06F 1/26* (2006.01)
*H01R 13/627* (2006.01)

(52) U.S. Cl.
CPC ............. *H01R 31/08* (2013.01); *G06F 1/266* (2013.01); *H01R 13/6278* (2013.01)

(58) Field of Classification Search
CPC ................ H01R 31/08; H01R 13/6278; H01R 13/7032; H01R 31/085; G06F 1/266; Y10S 439/942

USPC .......................... 439/507, 509–514, 516, 942
See application file for complete search history.

(56) References Cited

U.S. PATENT DOCUMENTS

| | | | |
|---|---|---|---|
| 4,158,114 A * | 6/1979 | Butler | H01R 13/70 200/1 R |
| 6,454,585 B1 * | 9/2002 | Homer | H01R 27/00 439/151 |
| 7,410,361 B2 * | 8/2008 | Sumitani | H01R 31/08 439/49 |
| 8,192,227 B2 * | 6/2012 | Gentner | H01R 31/08 439/511 |

* cited by examiner

*Primary Examiner* — Travis S Chambers
(74) *Attorney, Agent, or Firm* — Yuri Astvatsaturov

(57) ABSTRACT

Systems for adjusting power outputs of isolated electronic devices are described. A first connector including an external power pin and a field power pin connects an electronic device to a power supply. The first connector receives a first current level from the power supply at the external power pin, and a second current level from the power supply at the field power pin. A jumper block is configurable in a first position which electrically isolates the external power pin from the field power pin, and a second position which electrically couples the external power pin to the field power pin. The first position directs the first current level from the external power pin to a second connector, and the second position directs a combination of the first current level and the second current level from the external power pin and the field power pin to the second connector.

20 Claims, 8 Drawing Sheets

US 11,133,631 B2

REVERSIBLE JUMPER SYSTEM FOR NON-ISOLATED HIGH POWER OR ISOLATED LOW POWER SELECTION

BACKGROUND OF THE INVENTION

Many prominent industries require high-fidelity inspection processes to ensure a consistent, quality product. Conventionally, achieving this inspection standard involves machine vision systems. Generally speaking, machine vision enables a camera-based system to acquire and analyze image data for inspection purposes.

Conventional machine vision systems include 12 pin industrial M12 standards-based connectors. These connectors are rated at 30 volts (V) and 1.5 amps (A) per contact, and typically operate on a 24 V power supply. The input/output (I/O) is typically electrically isolated, such that two additional pins are required to function as the field power and field ground. Additionally, machine vision cameras typically support a 5 pin connector rated for 4 A per pin to drive external illumination.

However, a common issue is that these conventional machine vision systems cannot supply enough power for adequate external illumination because the camera cannot receive a sufficient amount of power across the M12 connectors. External, industrial power supplies are conventionally used in an attempt to circumvent this issue, but they are bulky and expensive.

Accordingly, there is a need for a way to supply ample power to external illumination devices for machine vision cameras through M12 connectors.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
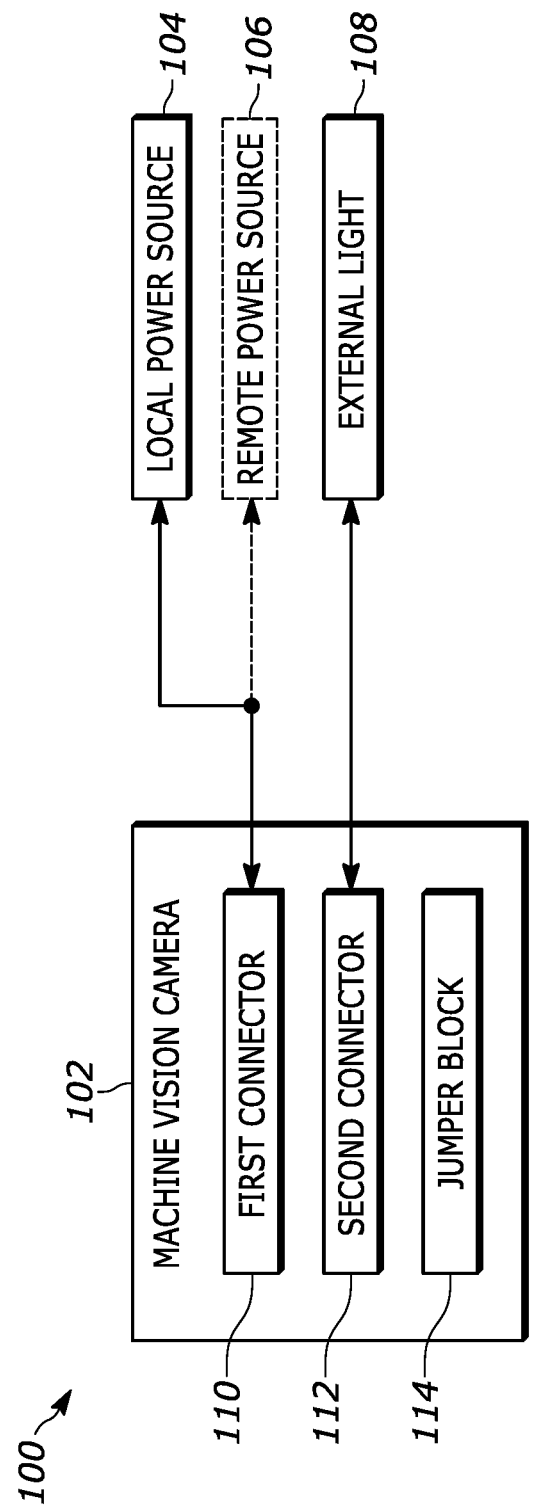
FIG. 1 illustrates an example system, in accordance with various embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In various embodiments of the present disclosure, reversible jumper systems for non-isolated high power or isolated low power selection are described. The systems provide solutions where, e.g., machine vision systems require variable amounts of illumination and/or require higher power illumination than conventional 12-pin connector architectures allow.

Generally speaking, machine vision systems benefit from increased illumination levels. Increased illumination levels allow the machine vision system to acquire finer resolution images, and correspondingly achieve higher accuracy in the final analysis. In many installations utilizing machine vision systems (e.g., automotive and industrial inspection), consumers implement external illumination sources to provide increased illumination levels for the machine vision systems. In fact, data from field studies indicates that over 70% of such installations use external illumination sources. Problematically, however, powering such external illumination sources has proven to be a challenge.

Standard external illumination sources for industrial use cases have power output capabilities exceeding 50 watts (W). However, as mentioned, machine vision systems operate on 12 pin industrial M12 standards-based connectors. Such connectors are rated at 30 V and 1.5 A per contact, and typically operate on a 24 V power supply. Consequently, such machine vision systems are capable of providing approximately 21 W of power to any connected external illumination source. Thus, if a consumer (e.g., automotive/industrial inspection clients) desires external illumination in excess of 21 W, the consumer will need to purchase, install, and maintain an external power source (e.g., industrial power supply).

Thus, the disclosure of the present application resolves such issues by providing reversible jumper systems for non-isolated high power or isolated low power selection. In this manner, the disclosure of the present application alleviates the burden of funding, installing, and maintaining bulky, expensive industrial power supplies and achieves various advantages. Namely, reversible jumper block systems disclosed herein provide the consumer the ability to alter the output power of a machine vision camera for external devices (e.g., external illumination devices) in a straightforward, compact manner. Thus, the reversible jumper block systems of the present disclosure provide a unique and identifiable improvement over prior art systems by enabling machine vision cameras to adequately and locally power external illumination systems, resulting in reduced cost and increased machine vision system performance and consumer satisfaction.

FIG. 1 illustrates an example system 100, in accordance with various embodiments of the present disclosure. The example system 100 may include a machine vision camera 102, a local power source 104, an optional remote power source 106, and an external light 108 (also referenced herein as an "illumination assembly"). The machine vision camera 102 may include a first connector 110, a second connector 112, and a jumper block 114.

Generally, the machine vision camera 102 operates to capture images of various environments and analyze those images to determine desired characteristics of the objects and/or areas of interest contained therein. Correspondingly, it is to be understood that the machine vision camera 102 may include all components necessary to perform standard machine vision protocols. For example, the machine vision camera 102 may include a processor (not shown), a memory (not shown), and a transceiver (not shown). Moreover, while referenced herein as a "processor" and a "memory," it is to be understood that, in embodiments, the processor may include two or more processors and the memory may include two or more memories.

To facilitate image capture and analysis, and as further described herein, the local power source 104 may provide power to camera subsystems of the machine vision camera 102. Using this power, the camera subsystems may capture the images of the various environments. Similarly, the optional remote power source 106 may provide power to isolated I/O electronics of the machine vision camera 102. Using this power, the isolated I/O electronics may, for example, process the images of the various environments captured by the camera subsystems.

However, as previously mentioned, to enable high fidelity image processing, the machine vision camera 102 may require considerable external illumination. Thus, the external light 108 may provide such external illumination. The external light 108 may receive power from the local power source 104 through the machine vision camera 102. Additionally or alternatively, in embodiments, the external light 108 may receive power from the optional remote power source 106 through the machine vision camera 102.

In any event, both the local power source 104 and the optional remote power source 106 may connect to the machine vision camera 102 via the first connector 110. The external light 108 may connect to the machine vision camera 102 via the second connector 112. The connectors (110, 112) may comply with any suitable standard, but in embodiments, the connectors (110, 112) may be M12 standards-based connectors. Moreover, each of the local power source 104, the optional remote power source 106, and the external light 108 may be configured to connect through the same connector (e.g., first connector 110). However, in practice, the external light 108 and power sources (104, 106) may connect to different connectors, but it should be understood that the local power source 104, the optional remote power source 106, and the external light 108 may each be detachably coupled with the machine vision camera 102 via either connector (110, 112).

Regardless, the jumper block 114 may be configured to adjustably configure current flow through the machine vision camera 102. More specifically, the jumper block 114 may be configured to adjustably configure the current flow from the local power source 104 and the optional remote power source 106 from the first connector 110 to the second connector 112. Adjustably configuring the current flow from the first connector 110 to the second connector 112 may impact the type of devices that may be connected to the machine vision camera 102 at the second connector 112. For example, in certain orientations of the jumper block 114, the current flow from the first connector 110 to the second connector 112 may be such that the external light 108 may be adequately powered to provide external illumination for the machine vision camera 102.

Figure 2A:
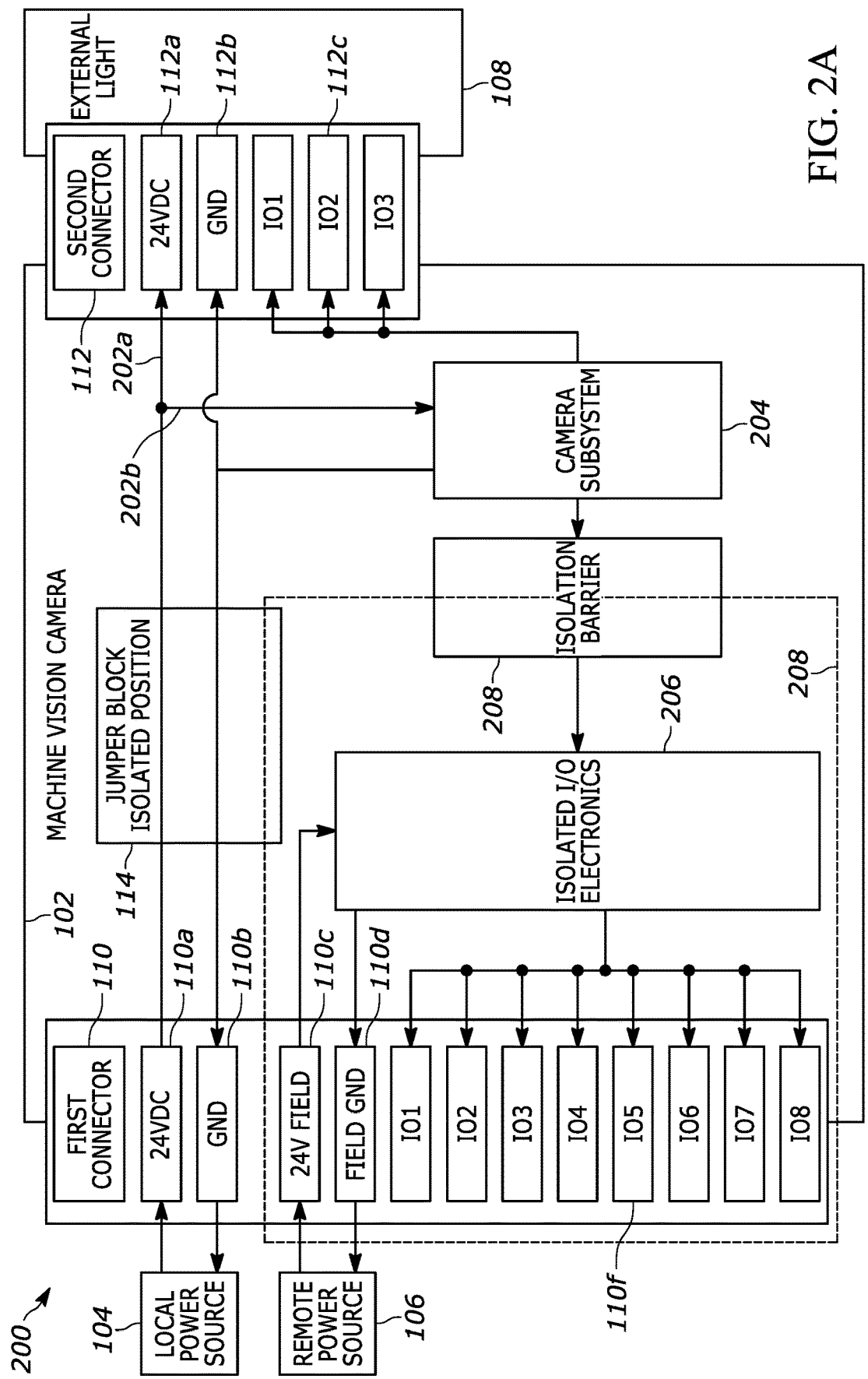
FIG. 2A illustrates an example isolated system of, for example, the example system of FIG. 1.

FIG. 2A illustrates an example isolated system 200 of, for example, the example system 100 of FIG. 1. In this system 200, the first connector 110 includes a 24 V Direct Current (DC) pin 110a, an external ground pin 110b, a 24 V field pin 110c, a field ground pin 110d, and a plurality of I/O pins (represented collectively as 110f). In embodiments where the first connector 110 is a M12 standards-based connector, the plurality of I/O pins 110f may include 8 total pins, but it is to be understood that the plurality of I/O pins 110f may include any suitable number of pins. Moreover, the second connector 112 may include a 24 V DC pin 112a, a ground pin 112b, and a plurality of I/O pins 112c. In embodiments, the plurality of I/O pins 112c may include 3 total pins, but the plurality of I/O pins 112c may include any suitable number of pins.

Generally, the example isolated system 200 provides a schematic illustration of the impact created by configuring the jumper block 114 in an isolated position. More specifically, the isolated position of the jumper block 114 enables the jumper block 114 to route current from the local power source 104 via the first connector 110 to the second connector 112. However, when routed in this manner, the current will split between the current 202a flowing to the second connector 112 and the current 202b flowing to the camera subsystem 204. To illustrate, both the second connector 112 and the camera subsystem 204 may be electrically connected to the 24 V DC pin 110a, such that both the second connector 112 and the camera subsystem 204 draw current from the 24 V DC pin 110a. Consequently, the second connector 112 and the camera subsystem 204 may draw an amount of current necessary to power the devices connected therein.

For example, assume the local power source 104 provides power through the 24 V DC pin 110a at 1.5 A. The camera subsystem 204 may draw 0.625 A of current from the 24 V DC pin 110a to power the internal camera systems of the machine vision camera 102. In that case, the second connector 112 may draw the remaining 0.875 A across the 24 V DC pin 112a to power any connected external devices. If, for example, the external light 108 is attached to the second connector 112, the external light 108 may draw the 0.875 A across the 24 V DC pin 112a to yield a 21 W power output for external illumination. Moreover, in embodiments, a combination of the 0.625 A drawn by the camera subsystem 204 and the 0.875 A drawn by the external light 108 may be sent to ground through the external ground pin 110b.

The remote power source 106 may provide power to the first connector 110 through the 24 V field pin 110c. This power may be routed to electrically connected isolated I/O electronics 206. The isolated I/O electronics 206 may send and/or receive signals to/from external sources related to the operation of the machine vision camera 102. For example, the isolated I/O electronics 206 may send signals, via the plurality of I/O pins 110*f*, to a programmable logic controller (PLC) (not shown) concerning the execution of trigger signals by the machine vision camera 102. The signals may further include camera 102 outputs (e.g., captured images, instructions to turn on/off external lighting, etc.), status updates regarding the camera 102 (e.g., shutter timing, exposure lengths, offline/on-line camera status, etc.), and/or any other suitable outputs/inputs or combinations thereof.

Similarly, the camera subsystem 204 may send/receive signals to any external devices connected to the second connector 112. For example, the camera subsystem 204 may send/receive signals through the plurality of I/O pins 112*c* to the external light 108. These signals may include, for example, configuration signals related to the external light 108 (e.g., drive external illumination, dim external illumination, etc.), status updates with respect to the external light 108 (e.g., service life updates of illumination sources (e.g., bulbs), connectivity status, execution status of driving commands, etc.), and/or any other suitable outputs/inputs or combinations thereof.

As previously stated, the jumper block 114 illustrated in FIG. 2A is configured in the isolated position. The "isolated position" refers to the electrical isolation of remote systems (not shown) receiving power from the remote power source 106. Namely, any remote systems connected to the machine vision camera 102 at any of the plurality of pins 110*f* and receiving power from the remote power source 106 via the first connector 110 pins (110*c*, 110*d*) are electrically isolated from components receiving power from the local power source 104. In practice, the isolated I/O electronics 206 may be circuits configured to interface the machine vision camera 102 to remote systems that should be electrically isolated from the rest of the machine vision camera 102. As an example, and as mentioned herein, the remote systems may include a PLC configured to exchange signals with the machine vision camera 102.

More specifically, the remote systems electrically connected to the first connector 100 pins (110*c*, 110*d*) are electrically isolated from the components connected to the first connector 110 pins (110*a*, 110*b*) via an isolation barrier 208. The isolation barrier 208 may include any suitable electrically isolating material, such that the current supplied from the local power source 104 does not electrically interfere with the current supplied from the remote power source 106. In this manner, any remote systems may receive power from the remote power source 106 at a steady current, and may return the current through the field ground pin 110*d* without potential interference from the external ground pin 110*b*.

Figure 2B:
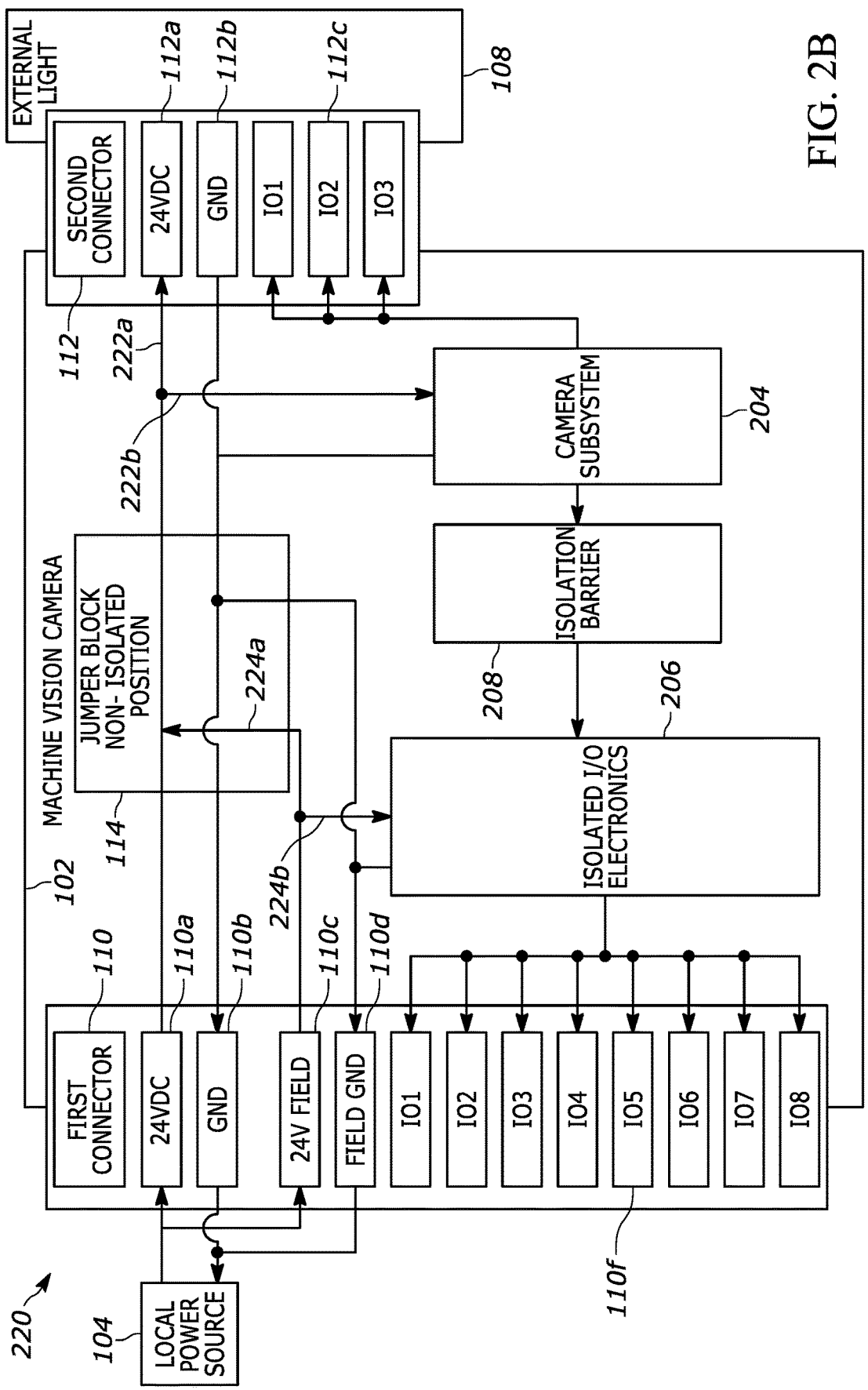
FIG. 2B illustrates an example non-isolated system of, for example, the example system of FIG. 1.

Such an isolated configuration may be advantageous where power sources are located remotely from the powered system. However, generally speaking, such an isolated configuration is unnecessary for machine vision systems in industrial applications because the power sources (e.g., local power source 104) are located proximately to the machine vision system (e.g., machine vision camera 102). Thus, the embodiments of the present disclosure take advantage of these proximately configured machine vision systems by altering the configuration of the jumper block from the isolated position (illustrated in FIG. 2A) to the non-isolated position, as illustrated in FIG. 2B. As will be described, changing to configuration of the jumper block 114 in this way bypasses the isolation barrier 208 to allow for more powerful external lighting at a lower system cost and complexity.

FIG. 2B illustrates an example non-isolated system 220 of, for example, the example system of FIG. 1. The non-isolated system 220 may include the machine vision camera 102, the local power source 104, the external light 108, the first connector 110, and the second connector 112. Moreover, the first connector 110 may include the 24 V DC pin 110*a*, the external ground pin 110*b*, the 24 V field pin 110*c*, the field ground pin 110*d*, and the plurality of I/O pins 110*f*. The second connector 112 may include the 24 V DC pin 112*a*, the ground pin 112*b*, and the plurality of I/O pins 112*c*.

Conventionally, and as discussed herein, powering all connected devices in a machine vision system with the local power source of the machine vision camera would render the system unable to adequately power many external illumination sources. Moreover, conventional systems maintained the isolation barrier (e.g., isolation barrier 208) between remote systems and the internal electronic components to avoid electrical interference between the two. However, in many machine vision systems, such electrical isolation is unnecessary because the power sources and the corresponding electrical grounds are proximate to the machine vision system. Thus, generally speaking, the non-isolated system 220 overcomes the limitations of these conventional systems by configuring the jumper block 114 in the non-isolated position (e.g., as illustrated in FIG. 2B). Configuring the jumper block 114 in this non-isolated position defeats the isolation barrier by ganging multiple 1.5 A pins (e.g., the 24 V DC pin 110*a* and the 24 V field pin 110*c*) together to provide an increased current flow to the external illumination source (e.g., external light 108).

For example, the non-isolated system 220 incorporates one power source (104) to power the connected devices. Namely, the non-isolated system 220 incorporates the local power source 104 of the machine vision camera 102 to power the camera subsystem 204, the isolated I/O electronics 206, and any devices connected to the second connector 112 (e.g., external light 108). In this system 220, the second connector 112 (and therefore, the external light 108) and camera subsystem 204 draw current from both the 24 V DC pin 110*a* and the 24 V field pin 110*c* via the jumper block 114 in the non-isolated position (illustrated as current portions 222*a* and 222*b*). In this manner, the non-isolated system 220 facilitates the local power source 104 of the machine vision camera 102 adequately powering the external light 108 while simultaneously powering the camera subsystem 204.

To illustrate, the local power source 104 provides power to both the 24 V DC pin 110*a* and the 24 V field pin 110*c*. A portion 224*a* of the current drawn across the 24 V field pin 110*c* flows through the jumper block 114 to combine with the current drawn across the 24 V DC pin 110*a*. The other portion 224*b* of the current drawn across the 24 V field pin 110*c* flows to the isolated I/O electronics 206 to power the electronics and other devices configured to input and/or output signals to/from the machine vision camera, as discussed herein. The portion 224*a* of the current flowing through the jumper block 114 combines with the current drawn across the 24 V DC pin 110*a* to create an amplified current flow directed to the camera subsystem 204 and second connector 112.

In embodiments where the first connector 110 is a M12 standards-based connector, each pin may be rated for 1.5 A, such that the current drawn across both the 24 V DC pin 110*a* and the 24 V field pin 110*c* is 1.5 A. In practice, the camera subsystem 204 and the isolated I/O electronics 206 may require known amounts of current to power any associated devices. For example, assume the camera subsystem 204 draws 0.625 A of current (e.g., current portion 222b) and the isolated I/O electronics 206 draw 0.1 A of current (e.g., current portion 224b) regardless of the current supplied to the 24 V DC pin 110a or the 24 V field pin 110c, respectively. Thus, the current portion 224a may supply 1.4 A of current to increase the total current supplied through the jumper block 114 to the second connector 112 and camera subsystem 204 to 2.9 A. The camera subsystem 206 may then draw 0.625 A of current from the 2.9 A supply (represented by current portion 222b), leaving 2.275 A of current to power the external light 108 via the 24 V DC pin 112a of the second connector 112. In this manner, the jumper block 114 may facilitate increasing the maximum output power of the external light 108 from the conventional 21 W to an increased 54.6 W.

Figure 3A:
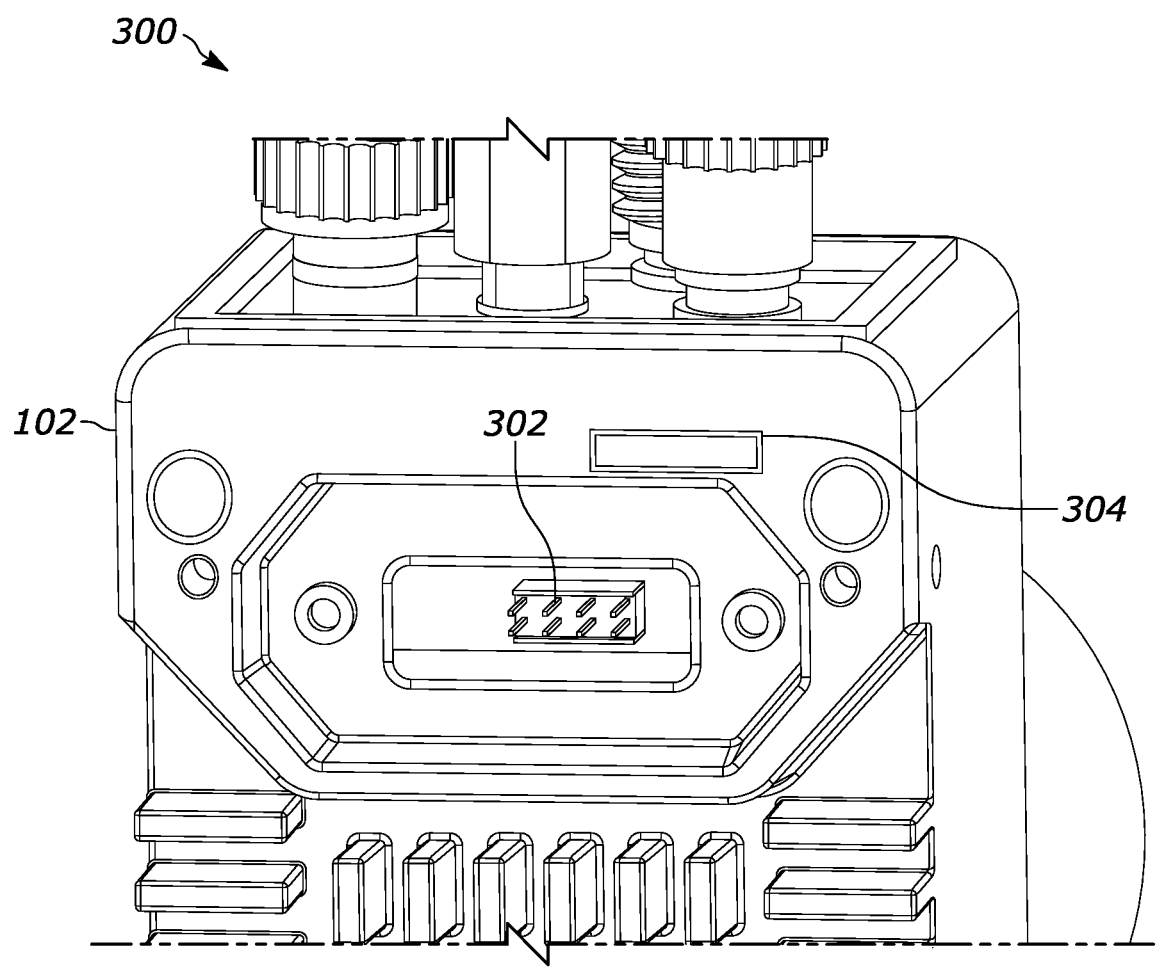
FIG. 3A depicts an example reception interface through which a machine vision camera may receive a jumper block, in accordance with various embodiments of the present disclosure.

FIG. 3A depicts an example reception interface 300 through which a machine vision camera 102 may receive a jumper block (e.g., jumper block 114), in accordance with various embodiments of the present disclosure. The interface 300 may include an 8-pin connector 302 and an isolation indicator 304. The 8-pin connector 302 may be configured to interface with an 8-slot insertion interface of the jumper block. The isolation indicator 304 may indicate to a user/operator an orientation of the jumper block that prohibits an electrical connection between the local power pins (e.g., 24 V DC pin 110a and external ground pin 110b) and the field power pins (e.g., 24 V field pin 110c and field ground pin 110d). As discussed herein, the indicator 304 may correspond to an analogous indicator included on the jumper block. Regardless, it is to be understood that the 8-pin connector 302 may be configured in any suitable manner to facilitate the camera 102 interfacing with the jumper block, and that the isolation indicator 304 may indicate an orientation of the jumper block either prohibiting or facilitating an electrical connection between the local power pins and the field power pins of the camera.

Moreover, in embodiments, the 8-pin connector 302 may be subdivided into portions. For example, the 8-pin connector 302 may have a first portion (not shown) that electrically couples the local power pins (e.g., 24 V DC pin 110a and external ground pin 110b) and the field power pins (e.g., 24 V field pin 110c and field ground pin 110d). The 8-pin connector 302 may also have a second portion (not shown) that electrically isolates the local power pins and the field power pins. Thus, in these embodiments, the jumper block may have a corresponding configuration for the 8-slot insertion interface of the block used to couple the block with the 8-pin connector 302.

To illustrate, assume the 8-pin connector 302 is subdivided such that 4 of the 8 pins are configured to electrically couple the local power pins and the field power pins. Conversely, assume that the remaining 4 pins are configured to electrically isolate the local power pins and the field power pins. Thus, the jumper block may include 4 electrically active slots of the 8-slot insertion interface, and 4 electrically isolated slots of the 8-slot insertion interface.

Depending on the configuration of the jumper block when the block is coupled to the camera 102, the 4 electrically active slots may align with the 4 pins configured to electrically couple the local power pins and the field power pins, and the 4 electrically isolated slots may align with the 4 pins configured to electrically isolate the local power pins and the field power pins. In that case, the jumper block may electrically couple the local power pins and the field power pins, such that the camera 102 may provide increased current flow to an external illumination source (e.g., 54.6 W to the external light 108).

In practice, and as discussed herein, the increased current flow results from the combination of the current level from the external power pin (e.g., 24 V DC pin 110a) and the current level from the field power pin (e.g., 24 V field pin 110c). In embodiments, the combination of the current level from the external power pin and the current level from the field power pin is greater than either the current level from the external power pin or the current level from the field power pin. Thus, some advantages of the present disclosure relate to an increased current level resulting from the combination, such that a null current level from one of the power pins (e.g., 110a, 110c) would nullify the advantageous properties associated with their combination.

Alternatively, the 4 electrically isolated slots may align with the 4 pins configured to electrically couple the local power pins and the field power pins, and the 4 electrically active slots may align with the 4 pins configured to electrically isolate the local power pins and the field power pins. Thus, the jumper block may electrically isolate the local power pins and the field power pins, such that the camera 102 may provide a smaller current flow to an external illumination source (e.g., 21 W to the external light 108).

Figure 3B:
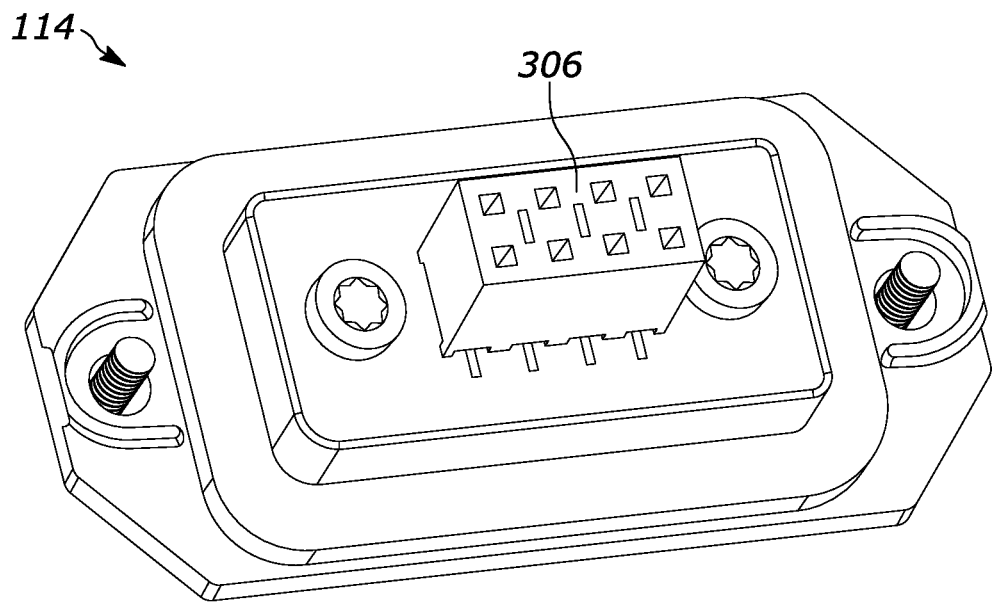
FIG. 3B depicts an example insertion interface through which a jumper block may detachably couple with a machine vision camera, in accordance with various embodiments of the present disclosure.

FIG. 3B depicts an example insertion interface 306 through which a jumper block 114 may detachably couple with a machine vision camera, in accordance with various embodiments of the present disclosure. In embodiments, the insertion interface 306 may be an 8-slot insertion interface, and may correspond to an 8-pin connector (e.g., 8-pin connector 302) of a machine vision camera (e.g., camera 102). As described herein, the insertion interface 306 may interface with the connector of the camera to electrically couple or electrically isolate the local power pins and the field power pins of the camera. Moreover, the insertion interface 306 may be subdivided in accordance with various embodiments described herein to facilitate electrically coupling or electrically isolating the local power pins and the field power pins of the camera. However, it is to be understood that the insertion interface 306 may be configured in any suitable manner to facilitate the jumper block 114 interfacing with the camera.

In embodiments, the jumper block 114 may include a first jumper block and a second jumper block. The first jumper block may be configured to electrically couple the power pins (e.g., 24 V DC pin 110a, 24 V field pin 110c) together. In this manner, the first jumper block may facilitate joining (additionally referenced herein as "ganging") the power pins together to supply an elevated level of current to the second connector, as described herein. Further, the second jumper block may be configured to electrically couple the ground pins (e.g., external ground pin 110b, field ground pin 110d) together. In this manner, the second jumper block may direct all return current through electrical ground pins connected to the power supply.

It is to be appreciated that the jumper block 114 may be affixed to the camera in any suitable fashion in order to electrically couple/isolate the local power pins and the field power pins of the camera. For example, the jumper block 114 may be affixed to the camera via screws (as illustrated), nails, adhesives, latches, locks, hinges, and/or any other suitable affixation device or combinations thereof.

Figure 3C:
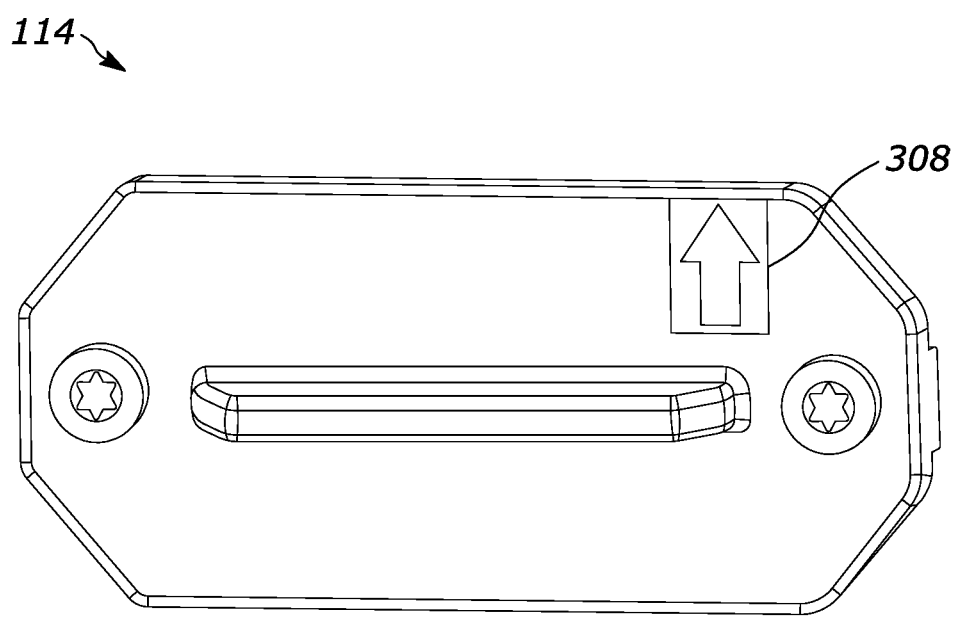
FIG. 3C depicts an example isolation indicator which may indicate an isolation configuration of a jumper block with respect to a machine vision camera, in accordance with various embodiments of the present disclosure.

FIG. 3C depicts an example isolation indicator 308 which may indicate an isolation configuration of a jumper block 114 with respect to a machine vision camera (e.g., camera 102), in accordance with various embodiments of the present disclosure. As discussed herein, the camera may include an isolation indicator (e.g., isolation indicator 304). In embodiments, when the isolation indicator of the camera is aligned with the isolation indicator 308, the jumper block 114 may electrically isolate the local power pins and the field power pins, such that the camera may provide a small current flow to an external illumination source (e.g., 21 W to the external light 108). Conversely, when the isolation indicator of the camera is not aligned with the isolation indicator 308, the jumper block 114 may electrically couple the local power pins and the field power pins of the camera, such that the camera may provide increased current flow to an external illumination source (e.g., 54.6 W to the external light 108).

To illustrate, a user/operator may intend to install the jumper block 114 into the camera. When installing the jumper block 114, the user/operator may check the position of the isolation indicator 308 to determine whether the jumper block 114 will electrically couple or electrically isolate the local power pins and the field power pins of the camera by observing whether the indicator 308 (represented in this embodiment by an arrow) is directed toward the corresponding indicator on the camera. For example, and as illustrated in FIG. 3C, the user/operator may determine whether the arrow representing the indicator 308 is pointing in the direction of the indicator on the camera (represented in FIG. 3A by the word "isolated"). Thus, if the arrow representing the indicator 308 is pointing in the direction of the indicator on the camera, the user/operator may determine that installing the jumper block 114 in this current configuration would result in the jumper block 114 electrically isolating the local power pins and the field power pins of the camera. While depicted in FIG. 3C as an arrow, it is to be understood that the isolation indicator 308 may be any suitable character, symbol, and/or any other indication or combination thereof.

Figure 3E:
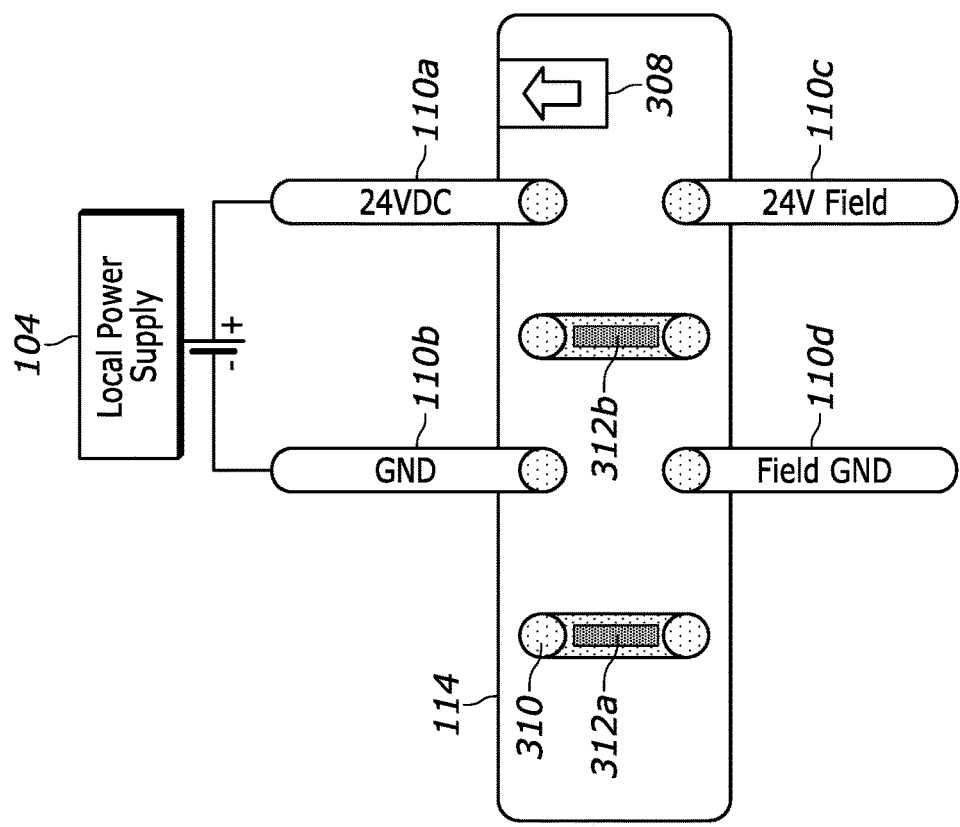
FIG. 3E illustrates an example isolated configuration of a jumper block, in accordance with various embodiments of the present disclosure.
Figure 3D:
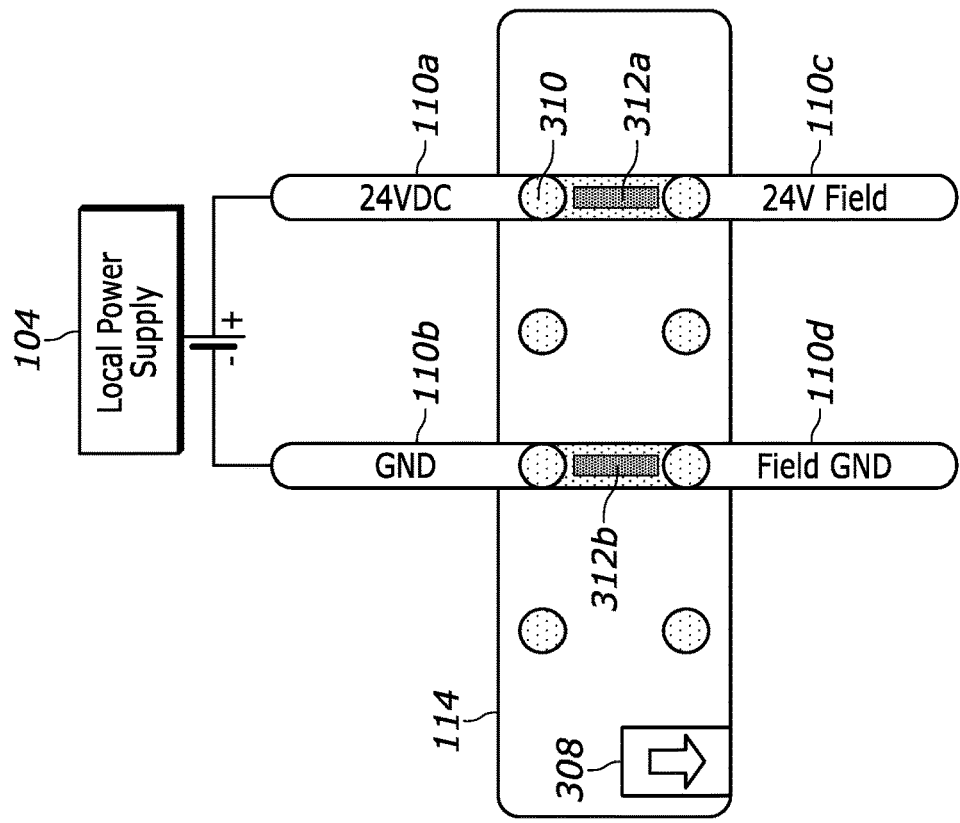
FIG. 3D illustrates an example non-isolated configuration of a jumper block, in accordance with various embodiments of the present disclosure.

FIG. 3D illustrates an example non-isolated configuration of a jumper block 114, in accordance with various embodiments of the present disclosure. Such configuration may represent the connections facilitated via the jumper block 114 when, for example, the indicator 308 is pointing away from the corresponding indicator on the camera (e.g., isolation indicator 304). The jumper block 114 may include a plurality of connecting pins 310, a first jumper 312a, and a second jumper 312b. The plurality of connecting pins 310 may facilitate the jumper block 114 physically, and thereby, electrically contacting the connector pins (e.g., 24 V DC pin 110a, external ground pin 110b, 24 V field pin 110c, and field ground pin 110d) of the machine vision camera (e.g., camera 102).

Moreover, the plurality of connecting pins 310 may facilitate the jumper block 114 coupling the connector pins of the machine vision camera via the jumpers (312a, 312b). In practice, the jumpers (312a, 312b) may facilitate electrical conduction between two of the plurality of connecting pins 310, such that the current from two distinct electrical sources may be combined. For example, the first jumper 312a may electrically couple the 24 V DC pin 110a to the 24 V field pin 110c, such that at least a portion of the 1.5 A of current supplied to both pins from the local power supply 104 may be ganged together to provide an elevated current flow to any connected devices/components (e.g., external light 108).

FIG. 3E illustrates an example isolated configuration of a jumper block, in accordance with various embodiments of the present disclosure. Such configuration may represent the connections facilitated via the jumper block 114 when, for example, the indicator 308 is pointing at the corresponding indicator on the camera (e.g., isolation indicator 304).

In this configuration, the plurality of connecting pins 310 may facilitate the jumper block 114 isolating the connector pins (e.g., 110a, 110b, 110c, and 100d) of the machine vision camera. As illustrated, the connecting pins 310 to which the connector pins of the camera are connected are not joined by either the first jumper 312a or the second jumper 312b. Thus, the jumpers (312a, 312b) will not facilitate electrical conduction between any of the connector pins (110a, 110b, 110c, 110d). Correspondingly, the local power supply 104 will only supply current via the local power pins (110a, 110b), and the field power pins (110c, 110d) will require a remote power source (e.g., remote power source 106) to maintain electrical isolation for the benefit of any connected remote systems.

Figure 4B:
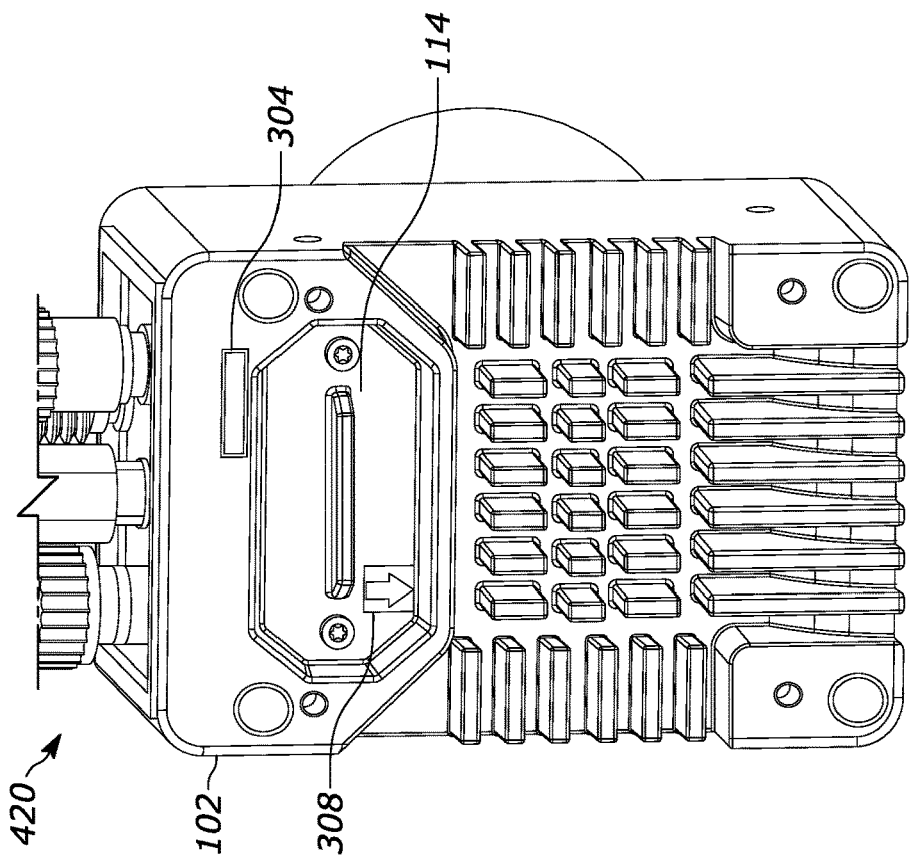
FIG. 4B depicts another example configuration of a jumper block coupled with a machine vision camera, in accordance with various embodiments of the present disclosure.
Figure 4A:
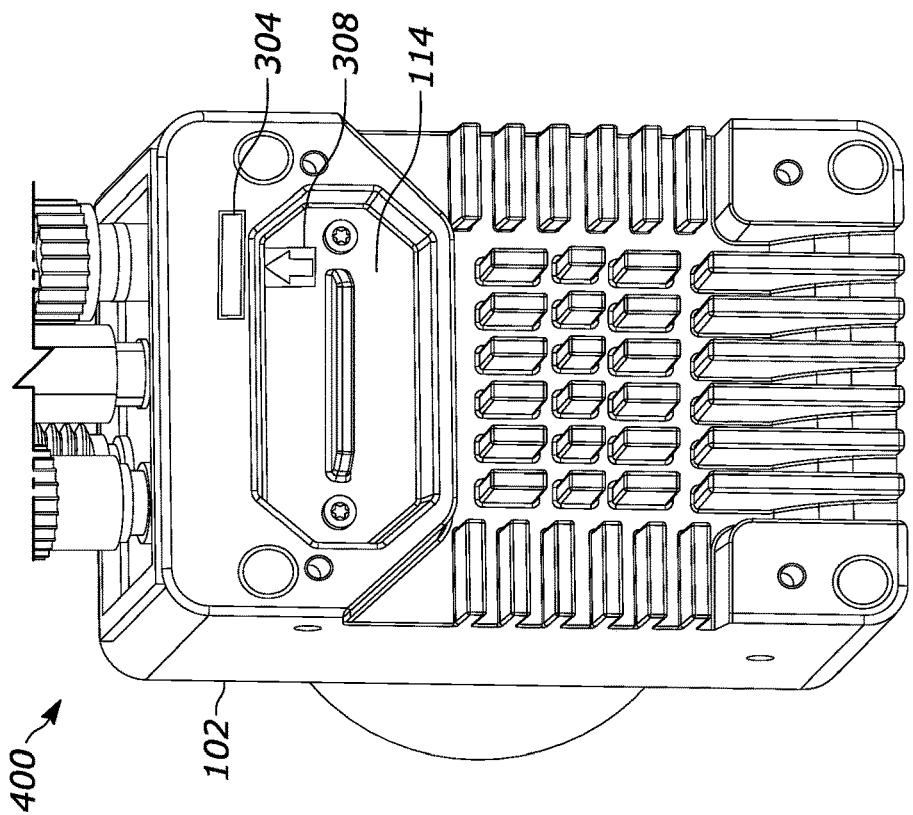
FIG. 4A depicts an example configuration of a jumper block coupled with a machine vision camera, in accordance with various embodiments of the present disclosure.

FIG. 4A depicts an example configuration 400 of a jumper block 114 coupled with a machine vision camera 102, in accordance with various embodiments of the present disclosure. The example configuration 400 also includes the isolation indicator 304 and the isolation indicator 308. As illustrated, the isolation indicator 308 is directed toward the isolation indicator 304. Thus, in this configuration 400, the jumper block 114 may electrically isolate the local power pins and the field power pins of the camera 102. Conversely, and as depicted in the example configuration 420 of FIG. 4B, the isolation indicator 308 on the jumper block 114 may be anti-aligned with the isolation indicator 304 on the camera 102. Thus, in this configuration 420, the jumper block 114 may electrically couple the local power pins and the field power pins of the camera 102.

Figures 4C, 4D:
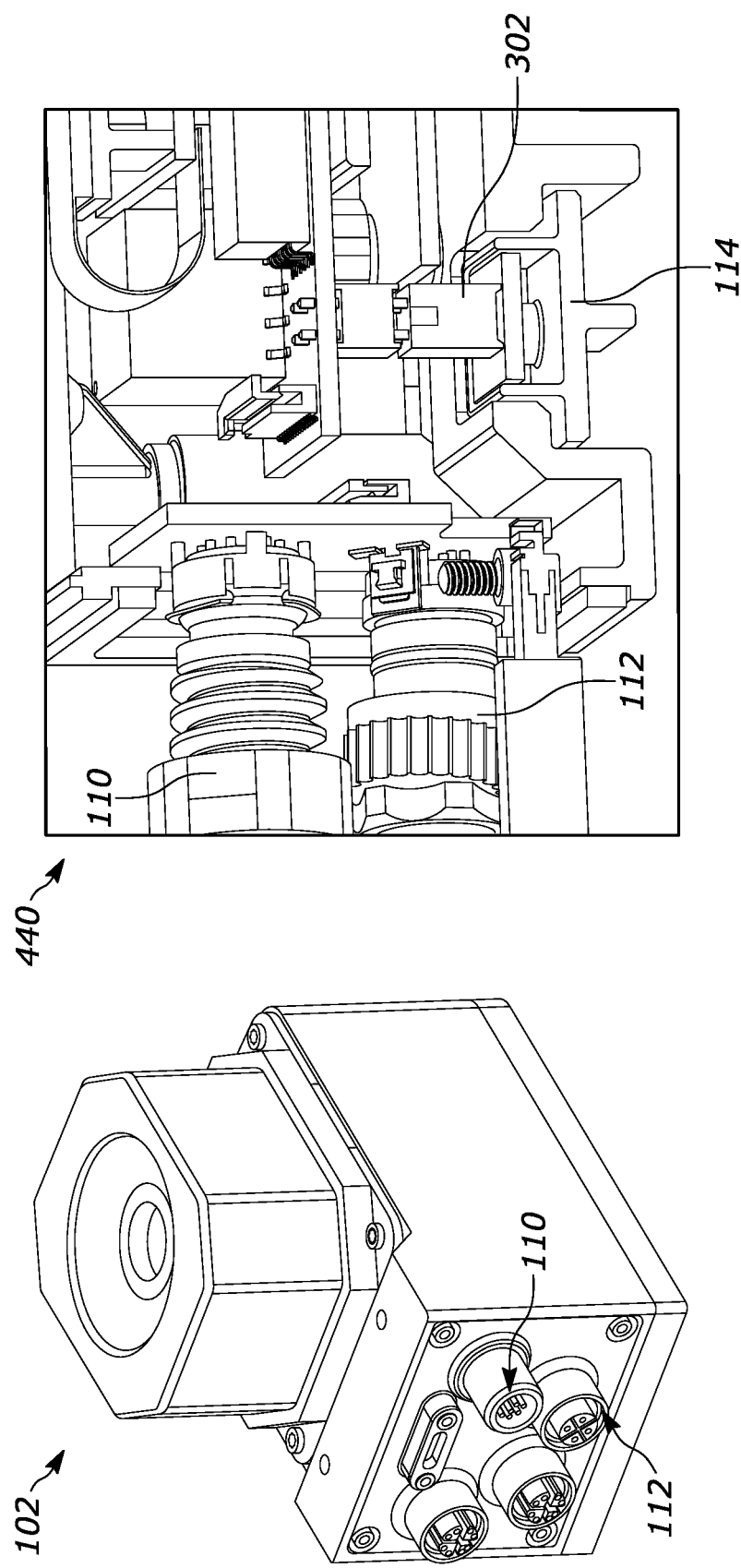
FIG. 4C depicts an example connector configuration for a machine vision camera, in accordance with various embodiments of the present disclosure.
FIG. 4D depicts an example configuration of a machine vision camera including a coupled jumper block and multiple connectors, in accordance with various embodiments of the present disclosure.

FIG. 4C depicts an example connector configuration for a machine vision camera 102, in accordance with various embodiments of the present disclosure. The example configuration includes the first connector 110 and the second connector 112. The first connector 110 and the second connector 112 may be configured to receive inputs of external devices, power supplies, and/or any other suitable inputs or combinations thereof. Moreover, when the connectors (110, 112) receive inputs, and the jumper block is coupled with the camera 102, the camera system may resemble the example configuration 440 depicted in FIG. 4D.

FIG. 4D depicts an example configuration 440 of a machine vision camera (e.g., machine vision camera 102) including a coupled jumper block 114 and multiple connectors (e.g., first connector 110, second connector 112, and 8-pin connector 302), in accordance with various embodiments of the present disclosure. As illustrated, the configuration 440 may enable the machine vision camera to capture images suitable for machine vision analysis based on an elevated level of illumination facilitated via the jumper block 114. For example, if the jumper block 114 is coupled to the camera in the non-isolated state (e.g., the jumper block 114 electrically couples the local power pins and the field power pins of the camera), then the camera will supply an elevated level of current to the second connector 112 that may be drawn by the pins of the connector 112 to power the external illumination source (e.g., the external light 108). In this manner, the embodiments of the present disclosure allow consumers to optimize their machine vision systems by supplying adequate power for external lighting without necessitating the purchase of bulky, expensive industrial power supplies.

The terms transmitter, receiver, and transceiver are used herein for example purposes and should not be construed as limiting. For example, it will be understood that references to an element being a transmitter or a receiver include that element being a transceiver. Furthermore, any reference to an element being a transceiver may include that element being implemented as a transmitter and/or receiver depending on whether the element is sending and/or receiving data.

It is to be appreciated that all specific values used in the foregoing specification are intended to be illustrative rather than restrictive, and that they may be any suitable values. Moreover, in the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Although the preceding text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for adjusting power outputs of isolated electronic devices, comprising:
a first connector configured to detachably connect an electronic device to a power supply, the first connector comprising an external power pin and a field power pin, wherein the first connector receives a first current level from the power supply at the external power pin, and wherein the first connector receives a second current level from the power supply at the field power pin,
a second connector, and
a jumper block configurable in a first position and a second position, the first position electrically isolates the external power pin from the field power pin, the second position electrically couples the external power pin to the field power pin, wherein the jumper block directs the first current level from the external power pin to the second connector when in the first position, and wherein the jumper block directs a combination of the first current level and the second current level from the external power pin and the field power pin to the second connector when in the second position.

2. The apparatus of claim 1, wherein the power supply is a local power supply of the electronic device.

3. The apparatus of claim 1, wherein a portion of the first current level is diverted to an imaging subsystem within the electronic device when the jumper block is in the first position, and wherein a portion of the combination is directed to the imaging subsystem when the jumper block is in the second position.

4. The apparatus of claim 1, wherein the second current level is diverted to a set of isolated electronic devices within the electronic device when the jumper block is in the first position, and wherein a portion of the combination of the first current level and the second current level is diverted to the set of isolated electronic devices when the jumper block is in the second position.

5. The apparatus of claim 1, wherein the combination of the first current level and the second current level is greater than the first current level and the second current level.

6. The apparatus of claim 1 wherein the jumper block comprises a first jumper block and a second jumper block, and wherein the first jumper block is configured to detachably couple the external power pin to the field power pin, and the second jumper block is configured to detachably couple the external ground pin and the field ground pin.

7. The apparatus of claim 1, wherein the electronic device is a first electronic device, and the second connector is configured to detachably connect the first electronic device to a second electronic device.

8. The apparatus of claim 7, wherein the first electronic device is an imaging assembly configured to capture an image, and wherein the second electronic device is an illumination assembly configured to receive (i) a first power level from the local power supply when the jumper block is in the first position, and (ii) a second power level from the local power source when the jumper block is in the second position.

9. The apparatus of claim 8, wherein the first illumination level is less than the second illumination level.

10. The apparatus of claim 1, wherein the first connector further comprises an external ground pin and a field ground pin.

11. The apparatus of claim 10, wherein the first current level returns through the external ground pin when the jumper block is in the first position, the second current level returns through the field ground pin when the jumper block is in the first position, and wherein the combination returns through both the external ground pin and the field ground pin when the jumper block is in the second position.

12. A system for adjusting power outputs of isolated electronic devices, comprising:
a power supply; and
a first electronic device comprising:
a first connector configured to detachably connect the first electronic device to the power supply, the first connector comprising an external power pin and a field power pin, wherein the first connector receives a first current level from the power supply at the external power pin, and wherein the first connector receives a second current level from the power supply at the field power pin,
a second connector configured to detachably connect the first electronic device to a second electronic device, and
a jumper block configurable in a first position and a second position, the first position electrically isolates the external power pin from the field power pin, the second position electrically couples the external power pin to the field power pin, wherein the jumper block directs the first current level from the external power pin to the second connector when in the first position, and wherein the jumper block directs a combination of the first current level and the second current level from the external power pin and the field power pin to the second connector when in the second position.

13. The system of claim 12, wherein the jumper block is detachably coupled to the first electronic device, and wherein changing the configuration of the jumper block from the first position to the second position includes (i) decoupling the jumper block from the first electronic device while in the first position, (ii) rotating the jumper block from the first position to the second position, and (iii) recoupling the jumper block to the first electronic device while in the second position.

14. The system of claim 12, wherein the first electronic device has a first power rating and the second electronic device has a second power rating, and wherein the first power rating is less than the second power rating.

15. The system of claim 12, wherein the first electronic device further comprises an imaging subsystem configured to:
receive a portion of the first current level when the jumper block is in the first position, and
receive a portion of the combination of the first current level and the second current level when the jumper block is in the second position.

16. The system of claim 12, wherein the first electronic device further comprises a set of isolated electronic devices configured to:
receive the second current level when the jumper block is in the first position, and
receive a portion of the combination of the first current level and the second current level when the jumper block is in the second position.

17. The system of claim 12, wherein the power supply is a local power supply of the first electronic device, the first electronic device is an imaging assembly configured to capture an image, and wherein the second electronic device is an illumination assembly configured to receive (i) a first power level from the local power supply when the jumper block is in the first position, and (ii) a second power level from the local power supply when the jumper block is in the second position.

18. The system of claim 17, wherein the imaging assembly is configured to capture an image via a machine vision protocol including one or more of (i) object recognition (OR), (ii) object character recognition (OCR), or (iii) facial recognition (FR), and wherein the first illumination level is less than the second illumination level.

19. The system of claim 12, wherein the first connector further comprises an external ground pin and a field ground pin.

20. The system of claim 19, wherein:
the external ground pin is configured to:
 receive the first current level when the jumper block is in the first position, and
 receive a portion of the combination of the first current level and the second current level when the jumper block is in the second position; and
the field ground pin is configured to:
 receive the second current level when the jumper block is in the first position, and
 receive a portion of the combination of the first current level and the second current level when the jumper block is in the second position.

\* \* \* \* \*